Jan. 24, 1933. G. TREESE 1,895,260
GEAR SHIFT LEVER SWITCH
Filed Nov. 13, 1930
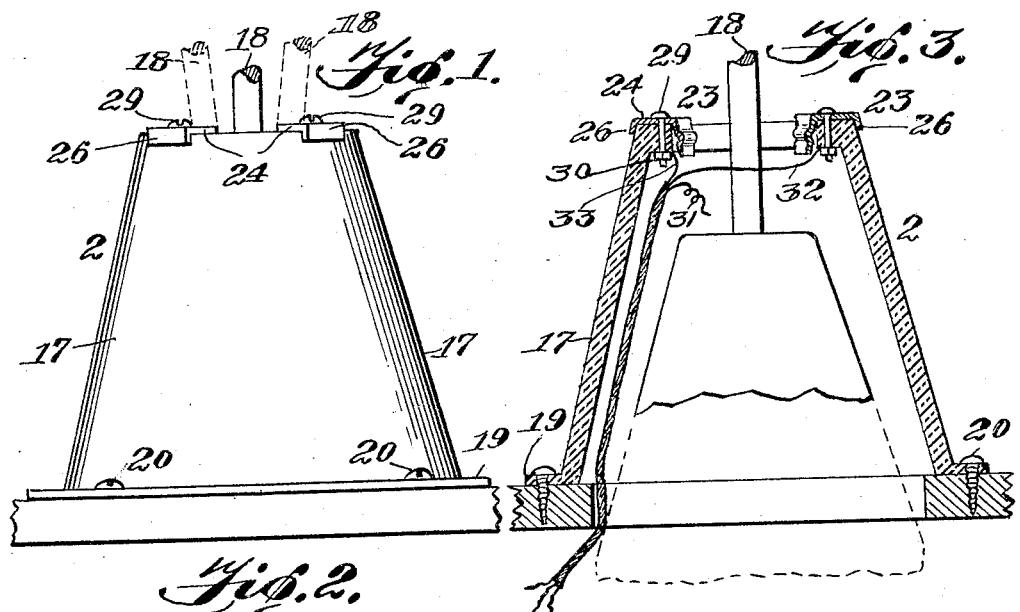
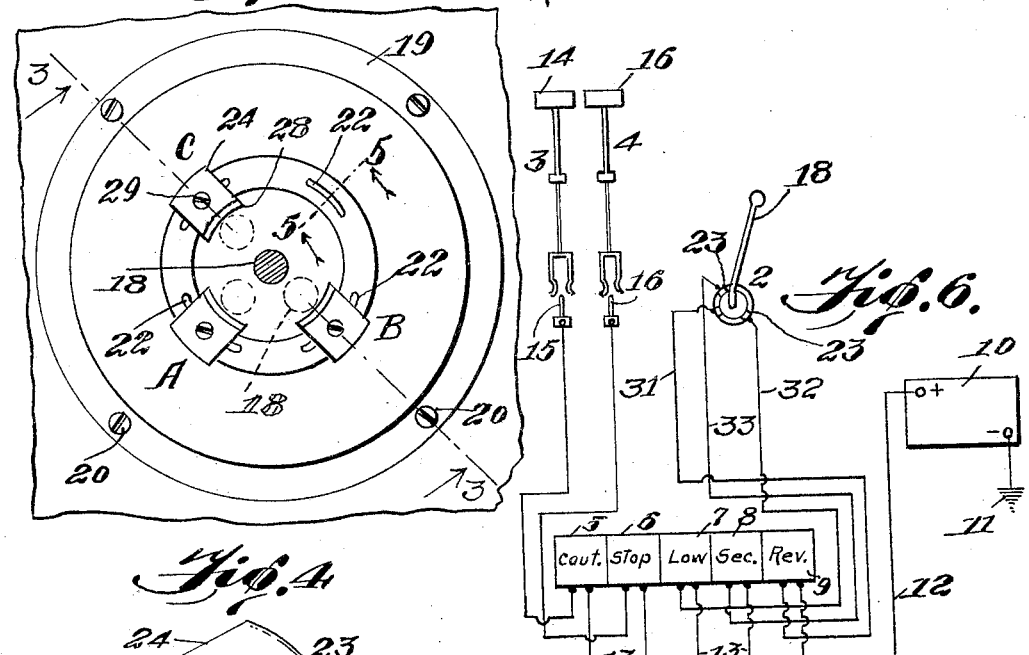
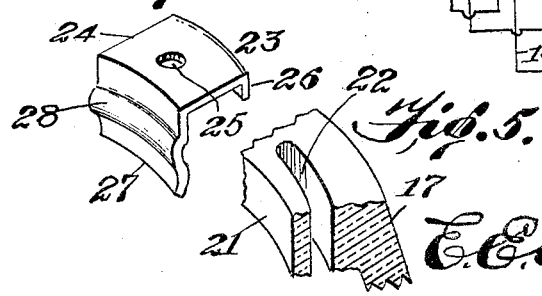
INVENTOR.
G. Treese
BY
E. E. Vrooman & Co., ATTORNEYS.

Patented Jan. 24, 1933

1,895,260

UNITED STATES PATENT OFFICE

GODDARD TREESE, OF GLOBE, ARIZONA, ASSIGNOR OF ONE-HALF TO RICHARD J. LOBB, OF GLOBE, ARIZONA

GEAR-SHIFT LEVER SWITCH

Application filed November 13, 1930. Serial No. 495,493.

This invention relates to a gear-shift lever switch.

An object of my invention is the provision of simple and efficient means which will greatly minimize accidents by showing on a motor vehicle, to an observing party, such as an approaching second motorist what is transpiring on the first or preceding motor vehicle.

Another object of my invention is the production of a simple and efficient gear-shift lever switch used as a necessary unit of my signal system.

With the foregoing and other objects in view, my invention comprises certain novel constructions, combinations and arrangements of parts as will be hereinafter fully described, illustrated in the accompanying drawing, and more particularly pointed out in the appended claims.

In the drawing:

Figure 1 is a view in side elevation of the gear-shift lever switch of my signal system, while Figure 2 is a top plan view of the same.

Figure 3 is a sectional view taken on line 3—3, Figure 2, and looking in the direction of the arrows.

Figure 4 is a perspective view of one of the contact devices of my gear-shift lever switch.

Figure 5 is an enlarged fragmentary, perspective view taken on line 5—5, Figure 2.

Figure 6 is a diagram of my complete safety first signal system.

Referring to the drawing by numerals, 1 designates the signal device, 2 is the gear-shift lever switch, 3 is the clutch pedal switch and 4 is the brake pedal switch. The signal device comprises a plurality of signals, as "caution" signal 5, "stop" signal 6, "low" signal 7, "second" signal 8, and "reverse" signal 9. A battery 10 is suitably grounded at 11 and is provided with positive wire 12 electrically connected through wires 13 to each of the signals 5 to 9, whereby electrical energy is supplied separately to each of said signals.

When the operator presses on pedal 14 of the clutch pedal switch 3, the circuit is closed at 15 whereby the signal 5 is actuated for indicating to the approaching automobilist that he should be careful or cautious. When the clutch pedal 16 (Figure 6) of the brake pedal switch 4 is pressed upon by the automobilist, the circuit is closed at 16, which causes the signal 6 to operate to indicate that the automobile provided with my system is slowing up or going to stop entirely, giving full notice to the oncoming motor vehicle in the rear, or to pedestrians. Of course, it is understood that the said switches 3 and 4 are suitably grounded in any ordinary manner (not shown).

My excellent gear-shift lever switch, used in my safety first signal system comprises a conical body 17, constituting a casing around the gear-shift lever 18. This gear-shift lever is the unique "blade" of my switch. The conical body is provided with an annular base flange 19, through which extend screws 20 that secure the same to the floor board of the automobile. It is to be understood that this conical casing or body may be formed of rubber or fiber, as the operator desires. The casing is slipped down over the lever 18 with the lever in the middle thereof when in a neutral position. The body 17 is provided with an inwardly-extending annular top flange 21, and in this top flange are a plurality of vertical elongated slots 22, for the purpose hereinafter described. I employ a plurality of contact devices 23 upon the casing. Each contact device comprises a flat body 24 (Fig. 4) having a vertical aperture 25 and on its outer edge with a depending curved flange 26. This flange 26 fits against the curved or rounded outer face of the body 17 (Figs. 1 to 3). The body 24 is provided with a depending longitudinally curved spring tongue 27; said tongue 27 is provided with a longitudinally curved outwardly projecting socket rib 28 against which lever 18 contacts when shifted into an operative position. The lever presses against tongue 27 and is "seated" in the socket constituted by the concaved spring tongue, with rib 28 insuring of an accurate and efficient contact. Further, any jarring or unauthorized movement of lever 18 is taken care of by the said peculiar construction of tongue 27, so as to always maintain an efficient contact with the engaged lever. A bolt 29 extends through aperture 25 of each contact device and through slot 22, with nut 30 thereon. This bolt and slot 22 allows sufficient body adjustment of the contact device upon the upper flanged edge of body 17 to cause the lever 18 to have an accurate contact which is very efficient and satisfactory. Each contact device 23 has electrical connection with one of the signals of the signal device 1; for instance wire 31 (Fig. 6) is connected at one end to the bolt of the contact device that is located on body 17 at "A" (Fig. 2) to be engaged by lever 18 when it is in "reverse", for causing the signal 9 to be operated. Wire 32 is connected to the contact device at "B" (Fig. 2) and is also connected to the signal 7, so that when the lever 18 is in "low" position, the signal 7 will be operated to indicate this to the observer. Wire 33 is connected at one end to the contact device at "C" (Fig. 2) and at its other end is connected to signal 8, so that when lever 18 is shifted to the "second" position, the corresponding signal 8 will be operated, for indicating this movement to the observer. Therefore, it will be seen that I have produced a novel combination in which the ordinary gear-shift lever is surrounded by a plurality of contact devices electrically connected to corresponding signals for indicating to an outsider or approaching automobilist the exact movements of the car or automobile in front.

It is to be understood that the signaling device 1 can be located in any convenient position upon the automobile. Further, that the positioning of the gear-shift lever switch 2, around the standard lever 18, can be easily accomplished and that the wiring of the system is simple and efficient.

While I have described the preferred embodiment of my invention and illustrated the same in the accompanying drawing, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a gear-shift lever switch for a signal system, the combination with a lever, of a casing around said lever and provided with an upper inwardly-extending annular flange, said inwardly-extending flange provided with curved elongated vertical slots, contact devices over said slots, and means extending through said contact devices and adjustably positioned in said curved slots for securing said contact devices in an adjusted position upon said inwardly-extending flange.

2. In a gear-shift lever switch for a signal system, the combination with a lever, of a conical casing around said lever and provided at its top with an annular inwardly-extending horizontal flange, said flange provided with a plurality of vertical, curved, elongated slots, curved contact devices resting on said top flange over said elongated slots, each contact device comprising a flat body provided with a vertical aperture registering with one of said elongated slots, a bolt extending through said aperture and one of said slots adjustably securing said curved contact device to said flange, said body provided on its inner edge with a comparatively long depending spring tongue curved longitudinally throughout its length, said spring tongue provided with an outwardly-extending horizontal curved socket-rib, and said lever adapted to engage snugly said curved socket-rib, substantially as shown and described.

In testimony whereof I hereunto affix my signature.

GODDARD TREESE.